(12) United States Patent
Kreuzer

(10) Patent No.: US 6,170,102 B1
(45) Date of Patent: Jan. 9, 2001

(54) OPERATING EQUIPMENT

(75) Inventor: Friedhelm Kreuzer, München (DE)

(73) Assignee: Kreuzer GmbH & Co. OHG, Puchheim (DE)

( * ) Notice: Under 35 U.S.C. 154(b), the term of this patent shall be extended for 0 days.

(21) Appl. No.: 09/341,976

(22) PCT Filed: Nov. 17, 1998

(86) PCT No.: PCT/EP98/07384

§ 371 Date: Jul. 16, 1999

§ 102(e) Date: Jul. 16, 1999

(87) PCT Pub. No.: WO99/25302

PCT Pub. Date: May 27, 1999

(30) Foreign Application Priority Data

Nov. 18, 1997 (DE) .......................................... 297 20 449 U

(51) Int. Cl.⁷ ..................................................... A61G 13/00
(52) U.S. Cl. ..................................................... 5/601; 5/600
(58) Field of Search .............................. 5/600, 10.1, 10.2, 5/611, 601

(56) References Cited

U.S. PATENT DOCUMENTS

| 3,627,250 | | 12/1971 | Pegrum ................................ 248/324 |
| 4,360,936 | * | 11/1982 | Keller ......................................... 5/9.1 |
| 4,842,259 | * | 6/1989 | Rice ........................................... 5/601 |
| 5,013,018 | * | 5/1991 | Sicek et al. ............................... 5/601 |
| 5,201,088 | * | 4/1993 | Larsson ................................ 5/601 X |

FOREIGN PATENT DOCUMENTS

| 1187764 | * | 2/1965 | (DE) ........................................ 5/601 |
| 0 321 822 | | 6/1989 | (EP) . |
| 2 186 835 | | 1/1974 | (FR) . |
| WO 96/35403 | | 11/1996 | (WO) . |

* cited by examiner

Primary Examiner—Terry Lee Melius
Assistant Examiner—Robert G. Santos
(74) Attorney, Agent, or Firm—Dike, Bronstein, Roberts & Cushman, LLP; George W. Neuner

(57) ABSTRACT

An operating equipment comprises an operating table (9) and a ceiling support carrying the operating table. This equipment achieves the advantage that the essential parts for the operation can be moved without a great expenditure of force to various places of the operating room relative to operating or sterilizing devices thereat.

9 Claims, 2 Drawing Sheets

OPERATING EQUIPMENT

The invention relates to an operating equipment comprising an operating table.

Conventionally the operating table is mounted to a support post which is fixed relative to the floor and provided at the center of gravity of the operating table. The position of the patient to be operated in the operating theatre is therefore fixed and operating equipment must be available to the centre of the operating table as well as to its environment. In order to overcome this drawback mobile operating tables are used which, however, can be moved with difficulty only because of their weight, and their rolls standing on the floor cause germ spreading.

It is the object of the invention to provide an operating equipment with an operating table which overcomes the above-described drawbacks.

This objected is achieved by the operating equipment defined in claim 1. Further developments of the invention are defined in the subclaims.

Further features and advantages of the invention will be apparent from the description of an embodiment with reference to the figures.

Figure 1:
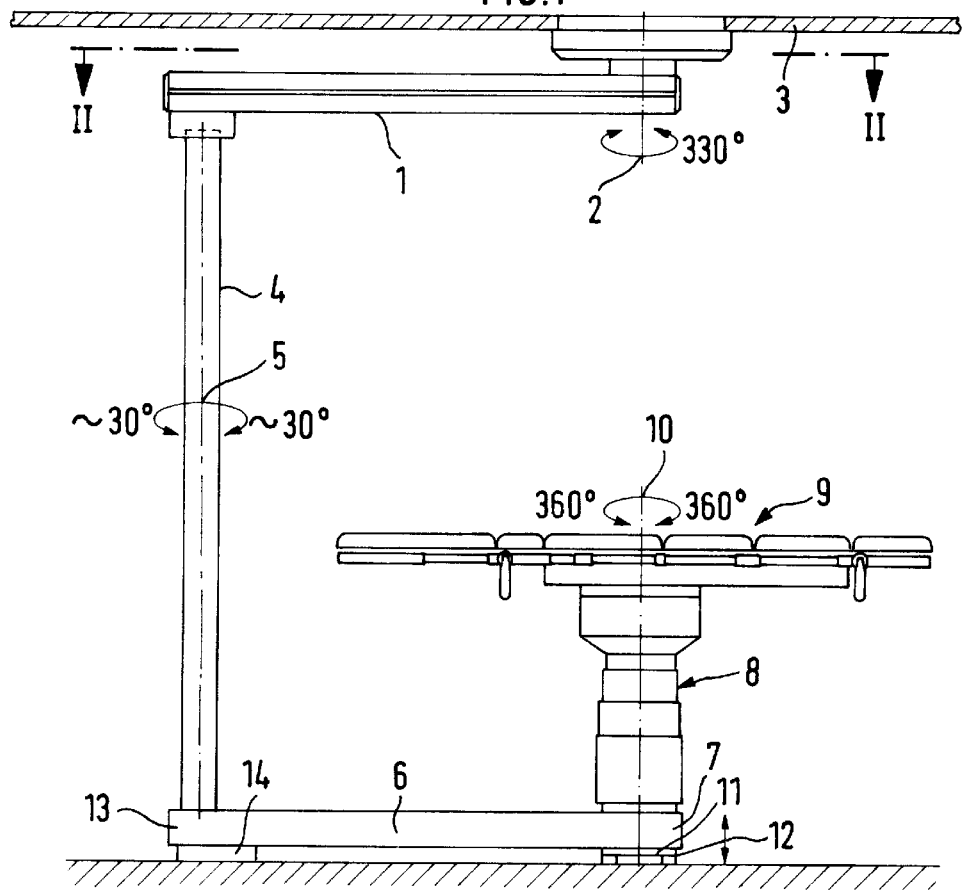
FIG. 1 is a side view of a first embodiment.

The equipment comprises a ceiling swivel arm 1 mounted in conventional manner to a ceiling 3 to be rotatable about a rotating or swivelling axis 2. A carrier post 4 is fastened to the free end of the swivel arm 1. The carrier post 4 itself is rotatable relative to the swivel arm 1 by a predetermined angle about a swiveling axis 5. A floor swivel arm 6 is fixed to the bottom end of the carrier post 4. The free end of the swivel arm 6 opposite to the carrier post carries a support post 8 with an operating table 9 supported thereby. The operating table 9 is mounted to rotate or swivel about the center axis 10 of the support post 8.

A brake devive 11 shown in breaking position in FIG. 1 is provided at the free end 7 of the floor swivel arm 6 below the support post 8. The brake device is formed to be movable in direction of the arrow 12 into a retracted release position away from the floor and towards a floor swivel arm to release the floor swivel arm and towards the floor into the brake position shown in FIG. 1. Preferably a further such brake device 14 is provided close to the end 13 of the floor swivel arm 6 opposite to the free end. The further brake device can likewise be moved from a release position retracted towards the floor swivel arms 6 to a brake position shown in FIG. 1 and vice versa.

Figure 2:
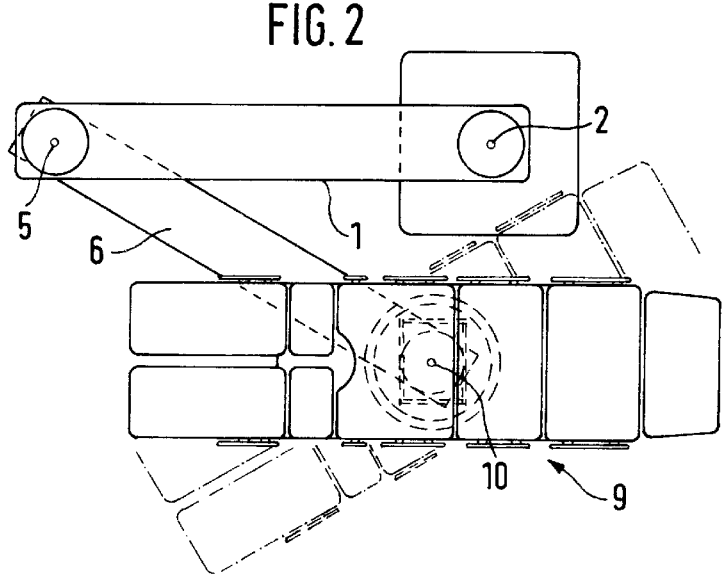
FIG. 2 is a top view along line II—II in FIG. 1.

FIG. 2 shows examples of a different operational positions of the operating equipment shown in FIG. 1.

Figure 3:
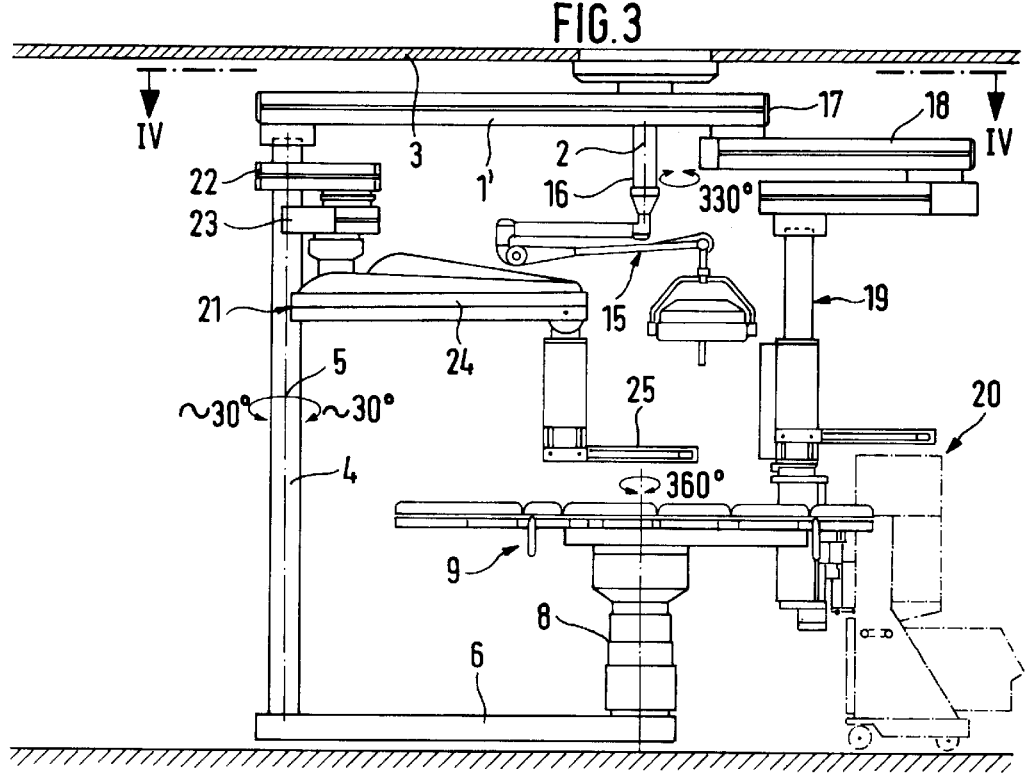
FIG. 3 is a side view of an embodiment with accessory units.

FIG. 3 shows an embodiment carrying an operating light, a surgery ceiling support and an anaesthesia ceiling support in addition to the equipment shown in FIG. 1. These accessory units can be mounted individually or in combination.

The operating light 15 comprises a post 16 which is arranged coaxially with the swivelling axis 2 and has an operating light mounted thereto in conventional manner. The operating light can therefore be swung horizontally across the region of the operating table.

As shown in FIG. 3 the ceiling swivel arm 1' is formed to have its end opposite to the end carrying the carrier post 4 to extend beyond the ceiling connection to form a free end 17. A second ceiling swivel arm 18 is mounted to the free end 17 and carries in conventional manner a second carrier post 19 for supporting an anaesthesia device 20.

A so-called surgery ceiling support 21 is provided at the first carrier post 4. To this end a support arm 22 is fixed to the carrier post 4 and supports, at its free end, a swivel arm 24 through intermediate members 23 in a conventional manner. A surgery table 25 is mounted to the free end of the swivel arm 24.

Figure 4:
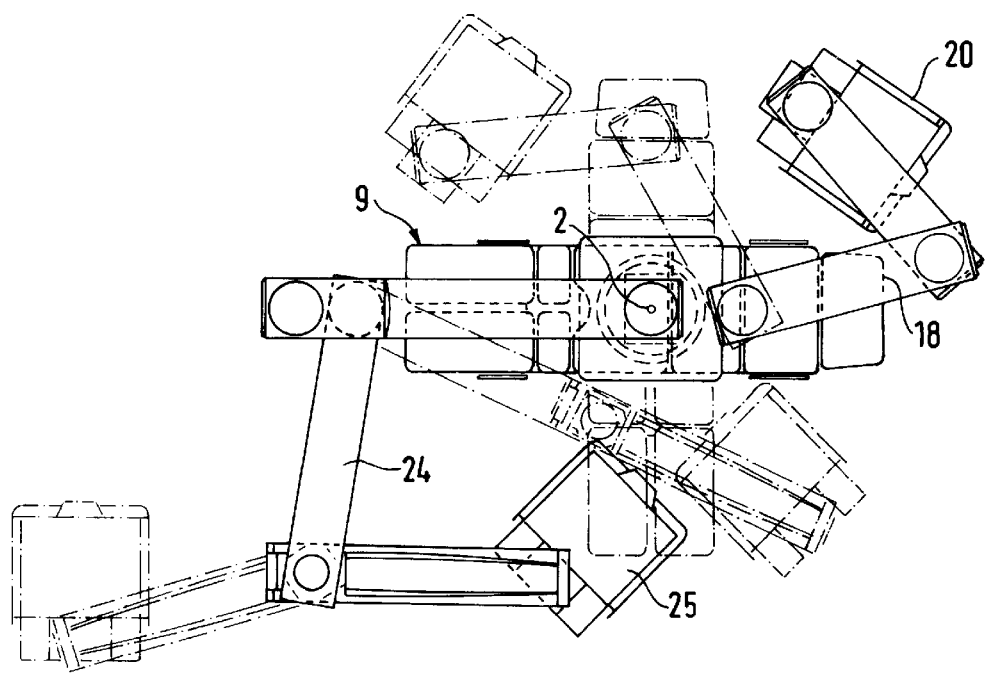
FIG. 4 is a top view along line IV—IV in FIG. 3.

In FIG. 4 different operational positions of the devices represented in FIG. 3 are shown.

What is claimed is:

1. An operating equipment comprising:

an operating table, ceiling support means supporting said operating table and means for mounting said ceiling support means to a ceiling, a carrier post, connected to said ceiling support means and spaced from said mounting means.

a floor swivel arm mounted to said carrier post, a first floor brake provided at an end of said floor swivel arm opposite to said carrier post, and means for operating said first floor brake.

2. The operating equipment of claim 1, wherein said ceiling support means further comprises:

a ceiling swivel arm supporting by said mounting means and having a free end, said carrier post having one end mounted to said free end of said ceiling swivel arm, said floor swivel arm mounted to the other end of said carrier post, and supporting means for supporting said operating table, said supporting means being supported by said floor swivel arm and spaced from said carrier post.

3. The operating equipment of claim 2, wherein said carrier post and said operating table support means each have a center axis and the mounting means comprises a swiveling axis for swiveling said ceiling swivel arm, and wherein a distance between the center axis of said carrier post and the center axis of the operating table support means substantially corresponds to the distance between the center axis of the carrier post and the swiveling axis of said ceiling swivel arm.

4. The operating equipment of claim 1, wherein said mounting means comprises a swiveling axis and said operating equipment further comprises an operating light and means for swiveling said operating light around said swiveling axis.

5. The operating equipment of claim 1, comprising a surgery support and means for pivotally mounting said surgery support to said carrier post.

6. The operating equipment of claim 2, wherein said ceiling support comprises a second ceiling swivel arm and a second carrier post supported by said second ceiling swivel arm for supporting an anesthesia device.

7. The operating equipment of claim 2, comprising means for rotating said operating table relative to said floor swivel arm around an axis of rotating having a distance from a center axis of said carrier post which corresponds to the distance between said center axis and a swiveling axis of said ceiling swivel arm.

8. An operating equipment comprising:

an operating table, ceiling support means supporting said operating table and means for mounting said ceiling support means to a ceiling, an operating table support means, a first floor brake provided below the operating table support means, and means for releasing said first floor brake.

9. The operating equipment of claim 8, wherein said ceiling support means further comprises a ceiling swivel arm supporting by said mounting means and having a free end, and a carrier post having one end mounted to said free end of said ceiling swivel arm, said operating equipment further comprising a second floor brake spaced from said first floor brake in direction towards said carrier post, and means for releasing said second floor brake.

\* \* \* \* \*